United States Patent [19]

Darden

[11] 4,109,769

[45] Aug. 29, 1978

[54] BRAKE ACTUATING MECHANISMS FOR BICYCLES

[76] Inventor: Donald R. Darden, 519 Corday St. Lot 3, Pensacola, Fla. 32503

[21] Appl. No.: 762,681

[22] Filed: Jan. 26, 1977

[51] Int. Cl.² .............................................. B62L 5/00
[52] U.S. Cl. .......................................... 192/5; 188/24
[58] Field of Search .................. 192/5; 188/24, 26, 27

[56] References Cited

U.S. PATENT DOCUMENTS

| | | | |
|---|---|---|---|
| 612,129 | 10/1898 | Doremus | 192/5 |
| 3,486,586 | 12/1967 | Grier, Jr. | 188/24 |
| 3,774,732 | 11/1973 | Basek | 188/24 |
| 3,858,689 | 1/1975 | Foster | 188/24 |
| 3,888,334 | 6/1975 | Mack | 188/24 |
| 3,966,229 | 6/1976 | Foster | 188/24 |

*Primary Examiner*—Granville Y. Custer, Jr.
*Attorney, Agent, or Firm*—Pollock, Vande Sande & Priddy

[57] ABSTRACT

Mechanisms are disclosed for actuating the conventional caliper brakes of bicycles by back pedalling the drive sprocket. In one embodiment, an overrunning clutch drives a cable drum which tensions an actuator cable for a caliper brake. In a further embodiment, a pawl riding on the drive sprocket of the bicycle extends a linkage which pulls a cable to actuate the caliper brake. In still another embodiment, a spiral gear is rotated upon back pedalling of the bicycle drive sprocket to tension a brake actuating cable.

16 Claims, 6 Drawing Figures

BRAKE ACTUATING MECHANISMS FOR BICYCLES

BACKGROUND OF THE INVENTION

In recent years, the sport of bicycling has experienced a considerable resurgence in popularity as the national interest in physical fitness has increased. Also, concern about fuel supplies has increased interest in modes of transportation not dependent on oil products. As a result, a large number light weight touring bicycles are now sold which include a type of hand actuated caliper brake which grips the rim of the bicycle wheel to provide braking power. Although such caliper brakes are preferred on touring bicycles due to their light weight and easy accessibility, it is generally conceded that the conventional, foot operated coaster brake is a more effective braking mechanism. The coaster brake is more effective because the great strength of the rider's legs can be applied to achieve a braking effect compared to the considerably smaller strength of the rider's hands and arms with the caliper type brakes. Moreover, for the many people who have grown accustomed to coaster type brakes, the change to hand brakes may be unnerving and dangerous.

Various efforts have been made over the years to devise linkages which will permit actuation of a caliper brake by back pedalling the drive sprocket of the bicycle as is done to apply a conventional coaster brake. While the prior art devices have experienced a measure of success, their complexity has apparently prevented widespread acceptance in the marketplace.

OBJECTS OF THE INVENTION

The primary object of this invention is to provide a mechanism which will permit a caliper type bicycle brake to be applied by back pedalling the drive sprocket of the bicycle.

Another object of the invention is to provide such a mechanism which is adapted for use with multi-speed bicycles having derailleur mechanisms for shifting the bicycle transmission.

Still another object of the invention is to provide such mechanisms which are simple in construction and adapted for attachment to a conventional bicycle without requiring modification of the bicycle frame or running gear.

These objects of the invention are given only by way of example. Thus, other desirable objects and advantages inherently achieved by the disclosed structure may occur to those skilled in the art. Nonetheless, the scope of the invention is to be limited only by the appended claims.

SUMMARY OF THE INVENTION

The above objects and other advantages are achieved by the invention which is especially suited for use in combination with a conventional bicycle of the type having a frame, at least two wheels, a drive sprocket, and a chain driven by the sprocket for rotating the drive wheel of the bicycle. In one embodiment, an overrunning clutch is attached to the bicycle frame in position to mesh with the drive sprocket upon back pedalling of the sprocket. A cable storage drum is attached to the output shaft of the overrunning clutch for the purpose of winding a cable stretched between the storage drum and a conventional caliper brake, to apply the brake.

In another embodiment, a pawl element is mounted near the bicycle drive sprocket on an extensible linkage which is pivoted to the bicycle frame. When the bicycle drive sprocket is rotated to move the bicycle in the forward direction, the pawl simply rides along the teeth of the drive sprocket; however, when the drive sprocket is back pedalled, the pawl catches in the teeth, thereby extending the linkage. A cable is attached to the linkage and stretched between the linkage and the caliper brake mechanism to actuate the brake.

Another embodiment of the invention includes a spiral gear segment mounted on a rod which is slidably mounted relative to the bicycle frame. The spiral gear segment is located adjacent the drive sprocket of the bicycle in position to be engaged by the drive sprocket when the sprocket is back pedalled. As the gear segment is rotated, its support rod moves against a spring. A cable stretched between the gear segment and a caliper brake mechanism provides for brake actuation.

DETAILED DESCRIPTION OF THE PREFERRED EMBODIMENTS

Figure 1:
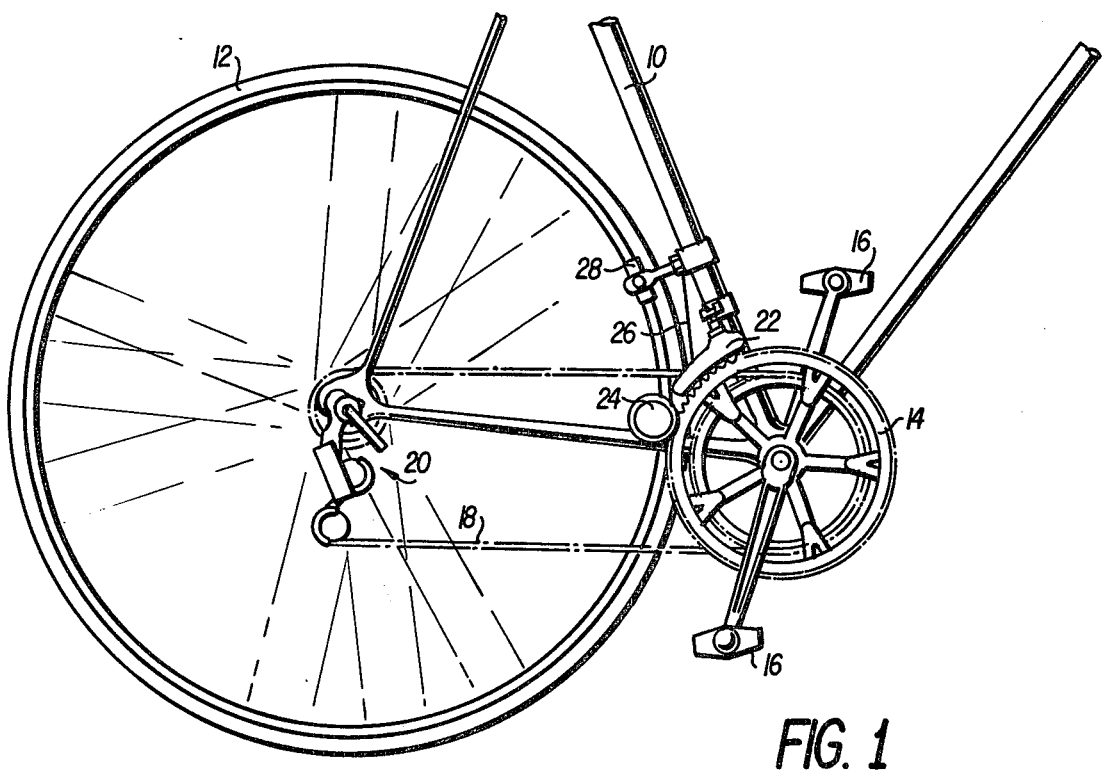
FIG. 1 shows a partial side view of a bicycle having the overrunning clutch embodiment of the invention.

There follows a detailed description of the preferred embodiments of the invention, reference being had to the drawings in which like reference numerals identify like elements of structure in each of the several figures.

In FIG. 1, a bicycle frame 10 is illustrated which rotatably supports a conventional rear wheel 12. A front drive sprocket or chain sprocket gear 14 is provided which is rotated by a combination pedal and crank 16 in the conventional manner. A chain 18 is run around sprocket gear 14 to rear derailleur mechanism 20 and then around one of the compound rear sprockets in the usual manner. A front deraileur 22 is provided for changing the effective diameter of sprocket gear 14. A rotary brake actuator 24 embodying an overriding clutch or ratchet mechanism is mounted to the lower rails of frame 10. A cable 26 extends from actuator 24 to a conventional caliper brake 28. When actuator 24 is operated by back pedalling the bicycle, cable 26 is tensioned as necessary to actuate calipers 28. Of course, any brake actuable by a cable may be used in the invention, in addition to the familiar caliper type.

Figure 2:
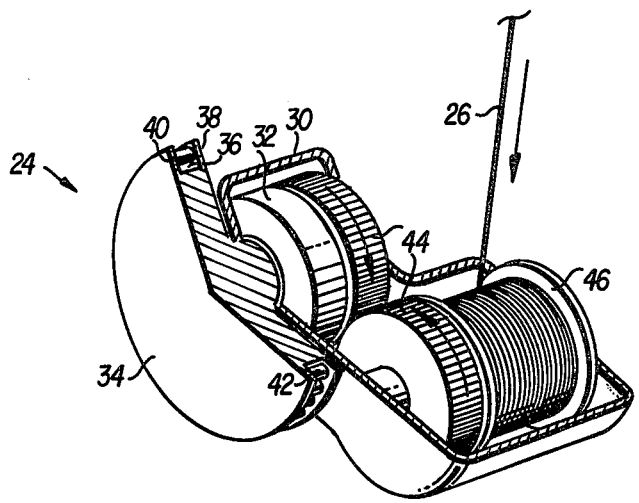
FIG. 2 shows a perspective view, partially broken away, of the overrunning clutch embodiment of the invention.

The structure of rotary brake actuator 24 is shown in FIG. 2. A housing 30 encloses an overrunning clutch or ratchet mechanism 32 which is drivingly connected to a drive disc 34. Clutch 32 may be designed to slip to prevent damage to parts upon application of excess pressure, if desired. Disc 34 includes a peripherally extending slot 36 having a pair of spaced, radially extending walls 38, 40. Extending between walls 38, 40 are a plurality of tooth elements 42 positioned to engage the front chain sprocket gear 14. Where sprocket gear 14 has two separate gear sizes, the smaller inner gear is preferred for meshing with tooth elements 42. Walls 38, 40 prevent disengagement due to lateral movement of the parts. Overrunning clutch 32 is of a known design which transmits rotating motion upon back pedalling of the bicycle but transmits no motion when the bicycle is pedalled to move in the forward direction. Of course, the clutch or ratchet mechanism is provided with sufficient lost motion among its elements to allow cable 26 to relax and release the brakes once back pedalling ceases, as will be understood by those skilled in the art. The rotary output of overrunning clutch 32 is transmitted to reduction gearing 44 which drives a cable storage drum 46. Cable 26 extends from drum 46 to calipers 28. When tension on cable 26 is released, the calipers open to release the brakes.

In operation, when drive disc 34 is rotated, rotary motion is transmitted through overrunning clutch 32, reduction gears 44 and cable storage drum 46 to apply tension to cable 26 to actuate the brakes. An excess of cable 26 may be stored on drum 46 to provide for ease of adjustment. Although the embodiment of FIGS. 1 and 2 is particularly adapted for use with a mechanically actuated brake, those skilled in the art will realize that overrunning clutch 32, reduction gears 44 and appropriate interconnecting tubing to a hydraulically actuated caliper brake, without departing from the scope of my invention.

Figure 3:
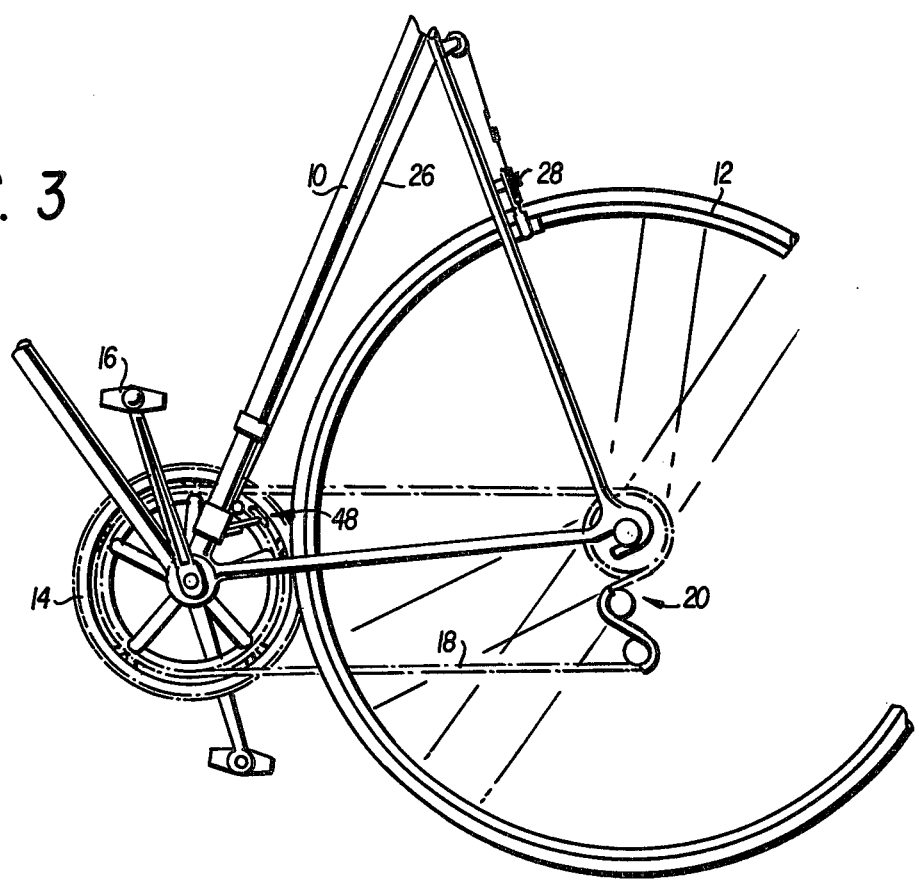
FIG. 3 shows a side view of a bicycle embodying the pawl and extensible linkage embodiment of the invention.
Figure 4:
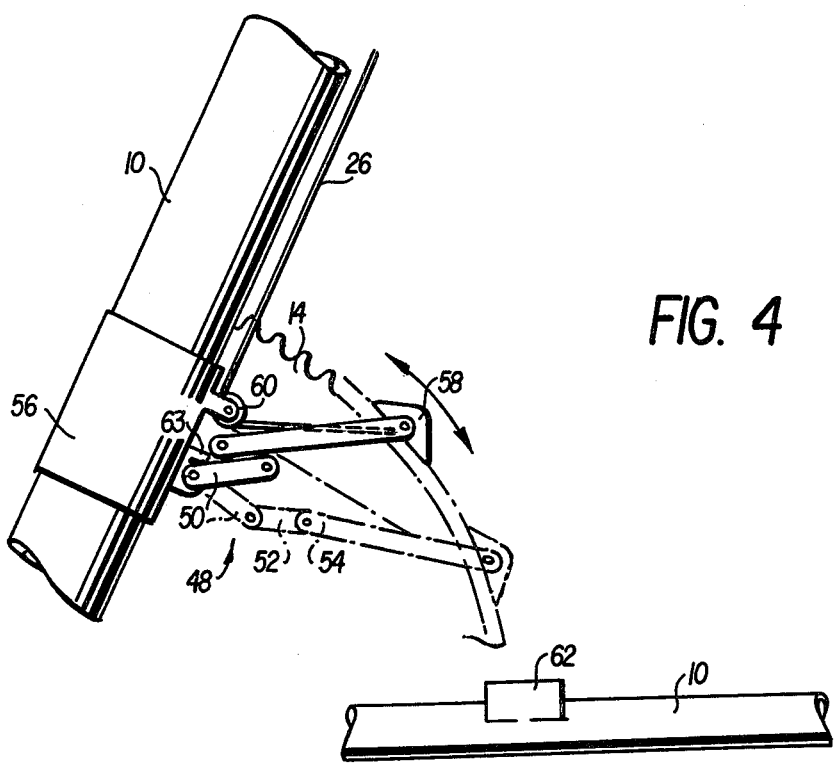
FIGS. 4 and 5 show detailed views of the pawl and extensible link embodiment of the invention, illustrating different modes of attachment to a bicycle frame.
Figure 5:
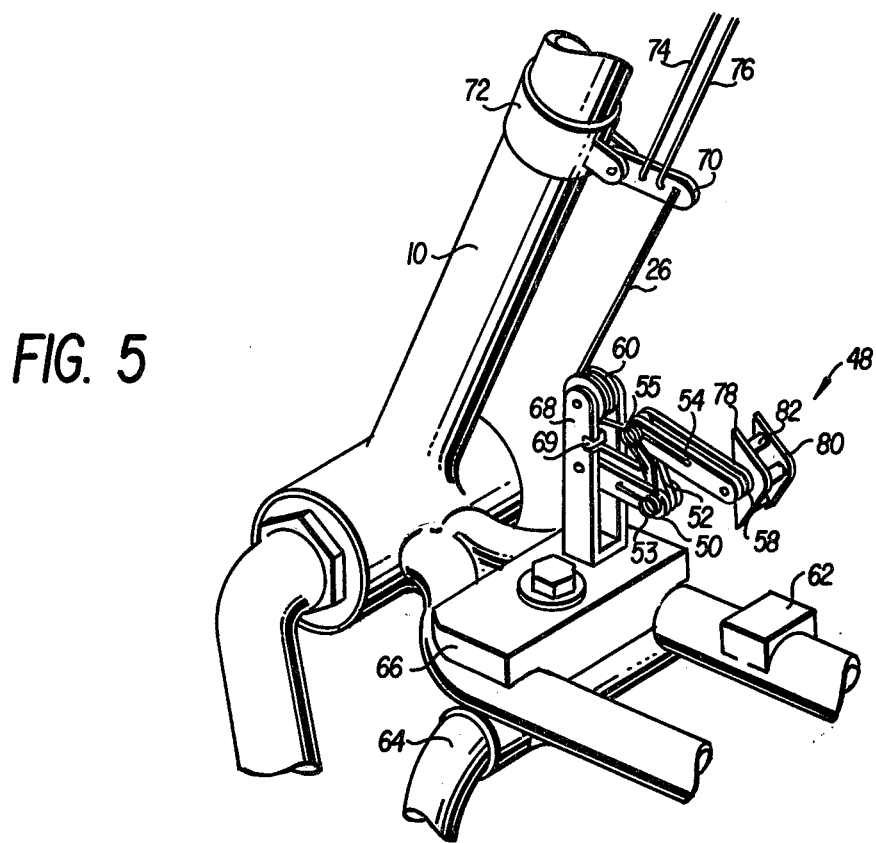

FIG. 3 shows a side view of a bicycle which includes an extensible linkage brake actuator 48. The details of two embodiments of extensible linkage brake actuator 48 are shown in FIGS. 4 and 5. A rigid base link 50, an intermediate link 52 and a pawl support link 54 are pivotably interconnected as illustrated and attached to a bracket 56 mounted on frame 10. At the outer end of pawl support link 54, a pawl element 58 is pivotably mounted for engagement with sprocket gear 14. Torsion springs 53 and 55 bias links 50, 52, and 54 to their illustrated position to ensure full disengagement of pawl 58 from sprocket 14 when back pedalling ceases. Bracket 56 also provides a rotating mount for a pulley 60 through which actuator cable 26 is threaded. A stop 62 is provided on frame 10 to prevent overactuation of actuator 48 upon movement of pawl element 58. Likewise, a stop finger 63 on bracket 56 prevents over-withdrawal of the linkage upon brake release, by limiting the movement of link 50. Thus, pawl 58 cannot become caught between chain 18 and sprocket 14.

In operation, when front chain sprocket gear 14 is rotated in the forward direction, pawl 58 is moved to the solid line position shown in FIG. 4 by springs 53 and 55, where the base link 50 and the intermediate link 52 move to a collapsed position and the pawl support link 54 and pawl element 58 momentarily continue to move with the sprocket gear 14 in a forward direction. Since the pawl support link 54 is situated above the pivot point of the sprocket gear 14, and since the retracted springs 53 and 55 no longer maintain an engaging tension on the pawl element 58, the support link 54 and engaged pawl element 58 will rise as the sprocket is moved in a forward direction, until the link 54 reaches its furthest forward position and the pawl element 58 is disengaged from the sprocket gear 14.

It should be appreciated that as the sprocket gear 14 continues to move forward, the pawl element 58 will continue to slidably engage and disengage the teeth of the sprocket gear 14 with a characteristic bouncing motion.

Upon backpedalling of the sprocket gear 14, the teeth 82 of the pawl element 58 drop into engagement with teeth of the sprocket gear 14 and the extensible linkage 50, 52 and 54 is pulled to the extended position shown in phantom in FIG. 4. It should be appreciated that the pawl element 58 remains engaged with the sprocket gear 14 during the backward movement due to the constant engaging tension that is applied on the pawl element by the extended springs 53 and 55. As the extensible linkage is drawn out to its extended position, cable 26 is tensioned to actuate the brake.

In the embodiment shown in FIG. 5, the bicycle is provided with a conventional kick stand 64 having a mounting clamp 66. A bracket 68, corresponding to bracket 56, is attached to mounting clamp 66 as illustrated. An inwardly turned tab 69 on bracket 68 limits movement of link 50 in the manner of finger 63 in the embodiment of FIG. 4. In this embodiment, the single actuator is particularly adapted for operating caliper brakes on both the front and rear wheels of the bicycle. To this end, calbe 26 is attached to the outer end of a transmission link 70 which is pivotably mounted to a bracket 72 attached to frame 10. A front brake cable 74 is attached to transmission link 70 at a location close to the pivot of link 70 with bracket 72; and a rear brake cable 76 is attached to transmission link 70 at a location more removed from the pivot. Due to this attachment of cables 74 and 76, a lesser tension is applied to cable 74 thereby applying a somewhat smaller braking force to the front caliper brake than to the rear caliper brake to equalize substantially the braking effects between the front and rear wheels. Of course, this provision for actuation of both front and rear brakes may also be used with the other embodiments of my invention.

As shown in FIG. 5, pawl element 58 comprises a pair of spaced retaining wall members 78, 80 attached to the outer end of support link 54. A plurality of spaced tooth elements extend between wall members 78, 80 in position to engage the teeth of sprocket gear 14. Walls 78, 80 prevent disengagement due to lateral movement of the parts.

Figure 6:
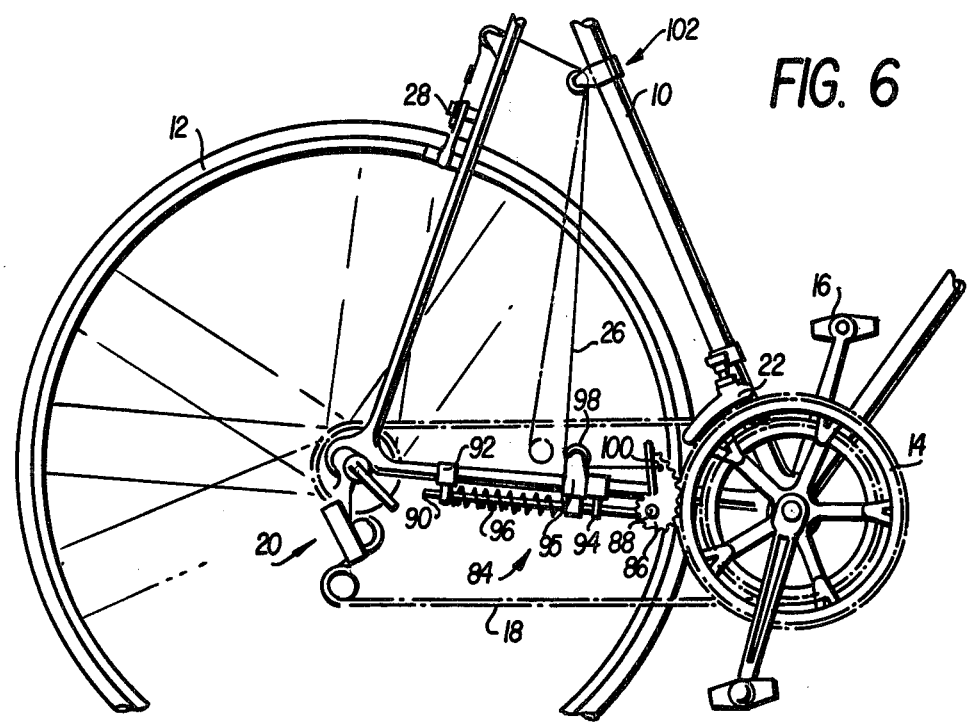
FIG. 6 shows a side view of a bicycle having the spiral gear embodiment of the invention.

FIG. 6 shows a self adjusting brake actuator 84 according to the invention. This embodiment of the invention is suitable for use with round sprocket gears 14 and also with the more recently developed oval or elliptical sprockets. A spiral gear 86 is provided which has a steadily increasing gear tooth radius relative to its axis of rotation 88. Gear 86 is mounted for rotation on one end of a rod 90 which, turn, is mounted for sliding motion in a pair of spaced, fixed brackets 92, 94. A spring 96, captured between fixed bracket 92 and a moveable bracket 95 mounted to move with rod 90, provides resilient resistance to the movement of rod 90 during brake actuation. A torsion spring at axis of rotation 88 (not shown) prevents spiral gear 86 from exceeding its range of movement counter-clockwise. As spiral gear 86 is rotated upon back pedalling of sprocket gear 14, cable 26 is pulled through a pulley 98 mounted on moveable bracket 95, due to the cable's attachment to spiral gear 86 at point 100. Bracket 95 moves rearward with rod 90 when spiral gear 86 is rotated clockwise by back pedal motion, as illustrated in phantom. In operation, when sprocket gear 14 is back pedalled, spiral gear 86 rotates in the clockwise direction and simultaneously translates toward the rear of the bike as the gear tooth radius increases. In the limiting case, the maximum rearward movement of rod 90 and bracket 95 limits the clockwise rotation of gear 86. To prevent disengagement of spiral gear 86 and sprocket 14, gear 86 preferably should include spaced retaining walls and tooth elements (not shown), similar in function to those shown in FIGS. 2 and 5.

A pulley bracket 102 is positioned on frame 10 so that cable 26 will approximate the equal sides of an isosceles triangle in the solid line and phantom positions shown in FIG. 6. With pulley bracket 102 located in this position, movement of rod 90, pulley 98, and bracket 95 will have a minimum effect on the effective length of cable 26. Pulley bracket 102 would not be mandatory for bicycles having circular front sprocket gears, such as sprocket gear 14 shown in FIG. 6. However, if the bicycle has an oval or eliptal front sprocket, the movement of rod 90, pulley 98, and bracket 95 would provide the adjustment necessary for the spiral gear 86 to maintain engagement with the changing tooth diameter of front sprocket gear 14. In this latter case, the proper placement of pulley bracket 102 ensures that this movement will have a minimum effect on cable tension and brake adjustments.

Having described my invention in sufficient detail to enable one skilled in the art to make and use it, I claim:

1. In combination with a bicycle having a frame, at least two wheels, at least one chain sprocket gear for meshing with a chain operatively associated with at least one of said wheels to rotate said at least one wheel, and at least one brake mechanism operatively associated with at least one of said wheels, an improved brake actuator comprising:
   over-running clutch means attached to said frame in position to mesh with said at least one chain sprocket gear, for transmitting rotational motion from said at least one chain sprocket gear only when said at least one chain sprocket gear is rotating in the direction opposite to that required to rotate said at least one wheel to move said bicycle in the forward direction;
   cable storage drum means adapted to be rotated by said over-running clutch means, said cable storage drum means having a cable wound thereon, said cable being operatively connected to said at least one brake mechanism to actuate said at least one brake mechanism when said overrunning clutch means transmits rotational motion from said at least one chain sprocket gear.

2. The combination of claim 1, further comprising a transmission link pivotally mounted to said frame and adapted to substantially equalize the braking effect on a front wheel and a rear wheel of said bicycle, said transmission link operatively connected at its free end to said cable for receiving an actuation force from said cable, and adapted to transmit said actuation force to a front brake cable attached adjacent a pivotal end of said transmission link and to a rear brake cable attached intermediate said free end and said pivotal end, to activate a front braking mechanism and a rear braking mechanism.

3. The combination of claim 1, further comprising reduction gearing operatively connected between said overrunning clutch means and said cable storage drum means.

4. The combination of claim 3, further comprising a housing enclosing said reduction gearing, said over-running clutch means and said cable storage drum means, said cable extending from said housing to said at least one brake mechanism.

5. The combination of claim 1, wherein said over-running clutch means comprises a drive gear positioned to mesh with said at least one chain sprocket gear.

6. The combination of claim 5, wherein said drive gear comprises a disc having a peripherally extending slot, said slot having spaced, radially extending walls; and a plurality of spaced tooth elements extending between said walls in position to engage said at least one chain sprocket gear, said radially extending walls serving to prevent unmeshing of said drive gear and said at least one chain sprocket gear.

7. In combination with a bicycle having a frame, at least two wheels, at least one chain sprocket gear for meshing with a chain operatively associated with at least one of said wheels to rotate said at least one wheel, and at least one brake mechanism operatively associated with at least one of said wheels, an improved brake actuator comprising:
   gear means having an axis of rotation and teeth for meshing and rotating with said at least one chain sprocket gear only when said at least one chain sprocket gear is rotating in the direction opposite to that required to rotate said at least one wheel to move said bicycle in the forward direction, said teeth being located at progressively increasing radius from said axis of rotation in the direction of rotation with said at least one chain sprocket gear;
   resilient mounting means for supporting said gear means on said frame and for permitting translation of said axis of rotation as said gear means rotates with said at least one chain sprocket gear; and
   a cable extending between said gear means and said at least one brake mechanism to actuate said at least one brake mechanism when said gear means rotates with said at least one chain sprocket gear.

8. The combination of claim 7, wherein said teeth are arranged in a spiral configuration about said axis of rotation.

9. The combination of claim 7, wherein said resilient mounting means comprises a rod mounted for movement relative to said frame, said gear means being mounted for rotation on said rod; and a spring for resisting movement of said rod.

10. The combination of claim 7, wherein said gear means comprises a pair of spaced retaining wall members for supporting a plurality of spaced tooth elements there-between and adapted to maintain said tooth elements in a meshed relation with corresponding meshing teeth of said at least one chain sprocket gear.

11. In combination with a bicycle having a frame, at least two wheels, at least one chain sprocket gear for meshing with a chain operatively associated with at least one of said wheels to rotate said at least one wheel, and at least one brake mechanism operatively associated with at least one of said wheels, an improved brake actuator comprising:
   a pawl element for meshing with said at least one chain sprocket gear for extensible movement therewith only when said at least one chain sprocket gear is rotating in the direction opposite to that required to rotate said at least one wheel to move said bicycle in the forward direction;
   extensible linkage means pivotally mounted to said frame at one end and to said pawl element at the other end and adapted to extend when said pawl is engaged with said sprocket gear and moving with said sprocket gear in said opposite direction; and cable means adapted to operatively connect said extensible linkage means and said at least one brake mechanism to actuate said mechanism to apply a breaking force when said extensible linkage means is extended.

12. The combination of claim 11, wherein said gear means comprises a pair of spaced retaining wall members for supporting a plurality of spaced tooth elements there-between and adapted to maintain said tooth elements in a meshed relation with corresponding meshing teeth of said at least one chain sprocket gear.

13. The combination of claim 11, further comprising a transmission link pivotally mounted to said frame and adapted to substantially equalize the braking effect on a front wheel and a rear wheel of said bicycle, said transmission link operatively connected at its free end to said cable for receiving an actuation force from said cable, and adapted to transmit said actuation force to a front brake cable attached ajacent a pivotal end of said transmission link and to a rear brake cable attached intermediate said free end and said pivotal end, to activate a front braking mechanism and a rear braking mechanism.

14. The combination of claim 11, further comprising stop means mounted on said frame for limiting the extended movement of said pawl element.

15. The combination of claim 11 wherein said bicycle has a removable kickstand attached to said frame, said extensible linkage means being attached to at least a portion of said removable kickstand for removal therewith.

16. The combination of claim 11, wherein said extensible linkage means collapses when said pawl element is moved in the direction to move said bicycle in the forward direction, whereby said pawl element moves out of extending engagement with said at least one chain sprocket gear.

* * * * *